US005603415A

United States Patent [19]
Balnis, Jr.

[11] Patent Number: 5,603,415
[45] Date of Patent: Feb. 18, 1997

[54] MODULAR COMPACT DISC STORAGE AND DISPLAY DEVICE

[76] Inventor: Arthur J. Balnis, Jr., 311 Circle Rd., Manchester, N.H. 03103-3182

[21] Appl. No.: 514,447

[22] Filed: Aug. 11, 1995

[51] Int. Cl.⁶ ........................................... A47F 7/00
[52] U.S. Cl. ............................................... 211/40
[58] Field of Search ..................... 211/40, 41, 87, 211/88, 194; 40/124; 206/309, 308.1; 312/107, 108, 111

[56] References Cited

U.S. PATENT DOCUMENTS

| | | | |
|---|---|---|---|
| 5,172,817 | 12/1992 | Gross | 211/40 |
| 5,184,736 | 2/1993 | Banker | 211/40 X |
| 5,232,089 | 8/1993 | Kim | 211/40 X |
| 5,518,112 | 5/1996 | Ono et al. | 211/40 X |

Primary Examiner—Alvin C. Chin-Shue
Assistant Examiner—Sarah L. Purol

[57] ABSTRACT

A device for storing and displaying compact disc jewel cases comprising a series of interconnecting identical modular units. Each unit includes a backwall of two vertically adjacent panels, a upper portion comprised of two identical dogs of trapezoid shape, each dog incorporates a stop of trapezoid shape descending downward from the front lower surface and a recess of dovetail cross-section integrated into the back edge, a lower portion comprised of two identical dogs of trapezoid shape, each dog incorporates a stop of trapezoid shape ascending upward from the front upper surface and a recess of dovetail cross-section integrated into the back edge, a right sidewall portion comprised of a rib of trapezoid shape incorporating two recesses of dovetail cross-section, a left sidewall portion comprised of a rib of trapezoid shape incorporating two recesses of dovetail cross-section, and a key of bow-tie shape to couple together two vertically, horizontally or diagonally adjacent units.

19 Claims, 9 Drawing Sheets 5,603,415

MODULAR COMPACT DISC STORAGE AND DISPLAY DEVICE

BACKGROUND—FIELD OF INVENTION

This invention relates generally to the field of display and storage assemblies and more particularly to an apparatus for storing and displaying compact disc jewel cases of the type that contain audio media.

BACKGROUND—DESCRIPTION OF PRIOR ART

Compact discs, which have become the medium of preference for the recording and performance of audio media, are housed within a plastic storage case known as a jewel case. The case is typically fabricated of plastic and includes a hinged front cover, which must be opened to gain access to the media inside. The inner portion of the front cover typically includes slots at the top and bottom edges thereof adapted to hold a folded or unfolded sheet of paper against the cover's inner surface. Artwork, title, artist and other identifying information of the media are usually printed on a front side of a slip of paper, allowing a user to view the artwork and identify the media through the clear plastic container cover. Due to the relatively small size of the case and the depiction of an array of interesting and attractive graphics thereon, it has become desirable to store the cases on free standing or wall mounted racks or boards. This allows the cases, particularly the unique graphics contained on the inside of the covers to be displayed in a decorative fashion. With the ability to easily interchange and arrange the cases on the display rack, a variety of interesting and unique designs are achieved to further enhance the musical environment.

Racks used for this purpose also enable the user to quickly scan a variety of media and select one with little effort. Unlike the selection process in choosing from media that has been arranged side by side or piled high on a shelf or inside a cabinet, using this apparatus of the present invention is easily the more efficient and appealing alternative.

The present invention provides a device which clearly overcomes the drawbacks associated with the prior art. For example, Hunt U.S. Pat. No. 4,946,147 and Tompkins U.S. Pat. No. 4,951,830 disclose jewel case display and storage racks which involve the use of loop pile or hook and pile fasteners (known by the trademark Velcro) to secure jewel cases to a rack or other mounting surface. The problem with these designs is fourfold. The first regards the difficulty in arranging and rearranging the cases in different patterns due to the relatively tight and somewhat inflexible connection between each case and the rack. The second regards the inconvenience and additional work involved in the user having to mount mating fasteners to the back of a display case each time there is an addition to the collection. The third regards the limit of only being able to display jewel cases in vertical and horizontal rows. The forth regards the predetermined number of cases which can be displayed by these devices.

Krattiger U.S. Pat. No. 5,105,952 discloses a jewel case storage and display rack system which involves the use of varying lengths of horizontal interconnecting panels which are assembled vertically. The problem with this design is threefold. The first regards the lack of any type of stay on the bottom edge to hold the jewel case in place. This reliance on gravity to hold each case in place makes the design unstable. The second regards the limit of only being able to display jewel cases in vertical and horizontal rows. The third regards the predetermined number of cases which can be displayed by these devices.

Hallgren U.S. Pat. No. 5,351,835 discloses a device for the storage and display of jewel cases involving the use of a ladder type maitre whereby four cases are displayed on horizontal rails. The problem with this design is threefold. The first regards the lack of any, type of stay on the bottom edge to hold the jewel case in place. This reliance on gravity to hold each case in place makes the design unstable. The second regards the predetermined number of cases which can be displayed by these devices. The third regards being limited to horizontal and vertical rows.

OBJECTS AND ADVANTAGES

Accordingly it is an object of the present invention to provide a device for storing and displaying one or more jewel cases which incorporates means to enable the easy removal of the case.

Another object of the present invention is to provide a device for storing and displaying one or more jewel cases which may be wall mounted.

Still another object of the present invention is to provide a device for storing and displaying jewel cases without the need for the attachment of independent fastener means.

Still yet another object of the present invention is to provide a device for storing and displaying one or more jewel cases which is easy and cost effective to manufacture.

Still yet another object oft he present invention is to provide a device for storing and displaying one or more jewel cases which is easy to install, remove and use.

Still yet another object of the present invention is to provide a device for storing and displaying one or more jewel cases which enables the user to arrange the jewel cases to best display the graphics thereon in an interesting and unique manner.

Still yet another object of the present invention is to provide a device for storing and displaying one or more jewel cases which enables the user to not be limited to only displaying jewel cases in horizontal or vertical rows.

Still yet another object of the present invention is to provide a device for storing and displaying one or more jewel cases which enables the user with an infinite amount of patterns to display at their discretion.

Still yet another object of the present invention is to provide a device for storing and displaying one or more jewel cases which can grow along with the addition of each new piece of media.

Other objects and advantages will become apparent in the following specifications when considered in the light of the attached drawings wherein a preferred embodiment of the invention is illustrated.

DRAWING FIGURES

The invention will be better understood and objects other than those set forth above will become apparent when consideration is given to the following detailed description thereof. Such description makes reference to the annexed drawings wherein.

REFERENCE NUMERALS IN DRAWINGS

| 10 | jewel case | 12 | device |
| 14 | lower panel | 16 | upper panel |
| 18 | opening | 20 | bore |
| 22 | screw | 24 | lower dog |
| 26 | gap | 28 | lower angled face |
| 30 | lower stop | 32 | recess |
| 34 | slant | 36 | upper dog |
| 38 | upper angled face | 40 | upper stop |
| 42 | rib | 44 | leading edge |
| 46 | mortise | 48 | key |
| 50 | surface | 52 | fillet |
| 54 | groove | 56 | face |

DETAILED DESCRIPTION OF THE PREFERRED EMBODIMENT

As required, detailed embodiments of the present invention are disclosed therein; however it is to be understood that the disclosed embodiments are mainly exemplary of the invention, which may be embodied in many forms. Therefore specific structural and functional details disclosed hereto are not to be interpreted as limiting, but merely as a basis for teaching one skilled in the art to variously employ the present invention in virtually any appropriately detailed structure.

Figure 1:
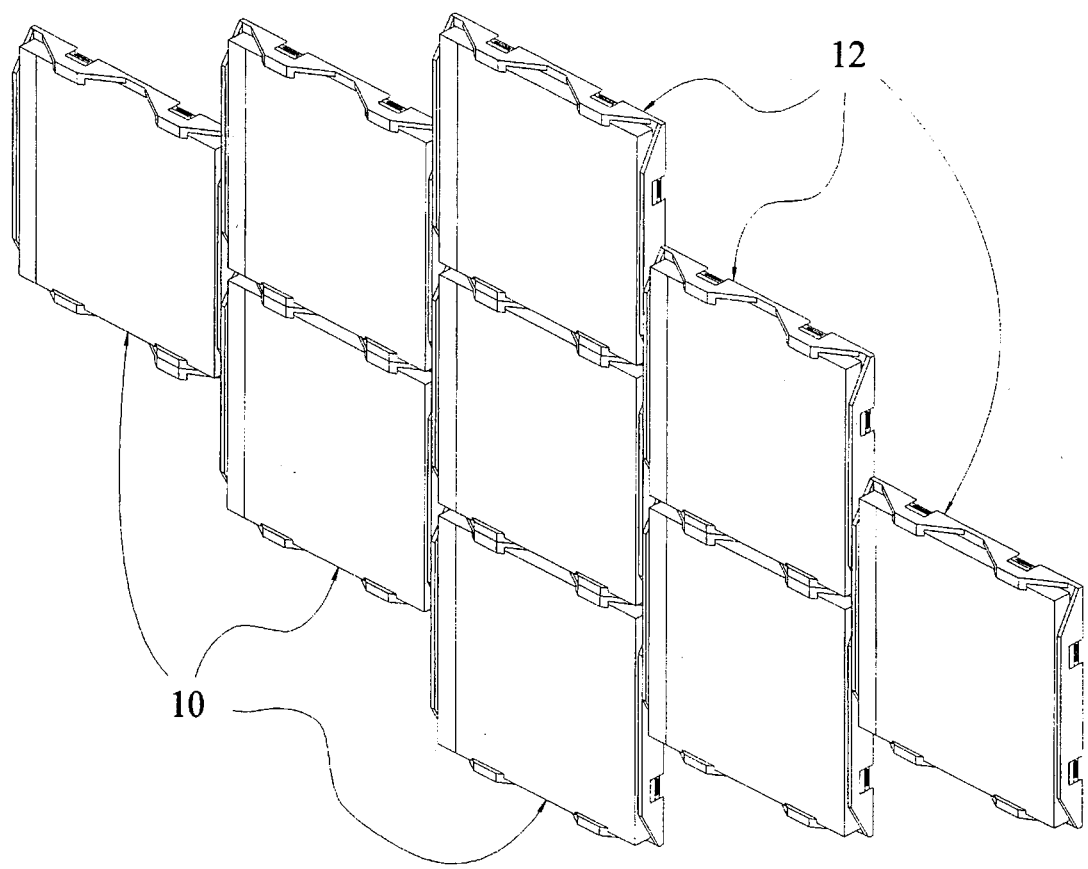
FIG. 1 is a frontal perspective view of a grouping of the present invention with jewel cases stored therein.
Figure 2:
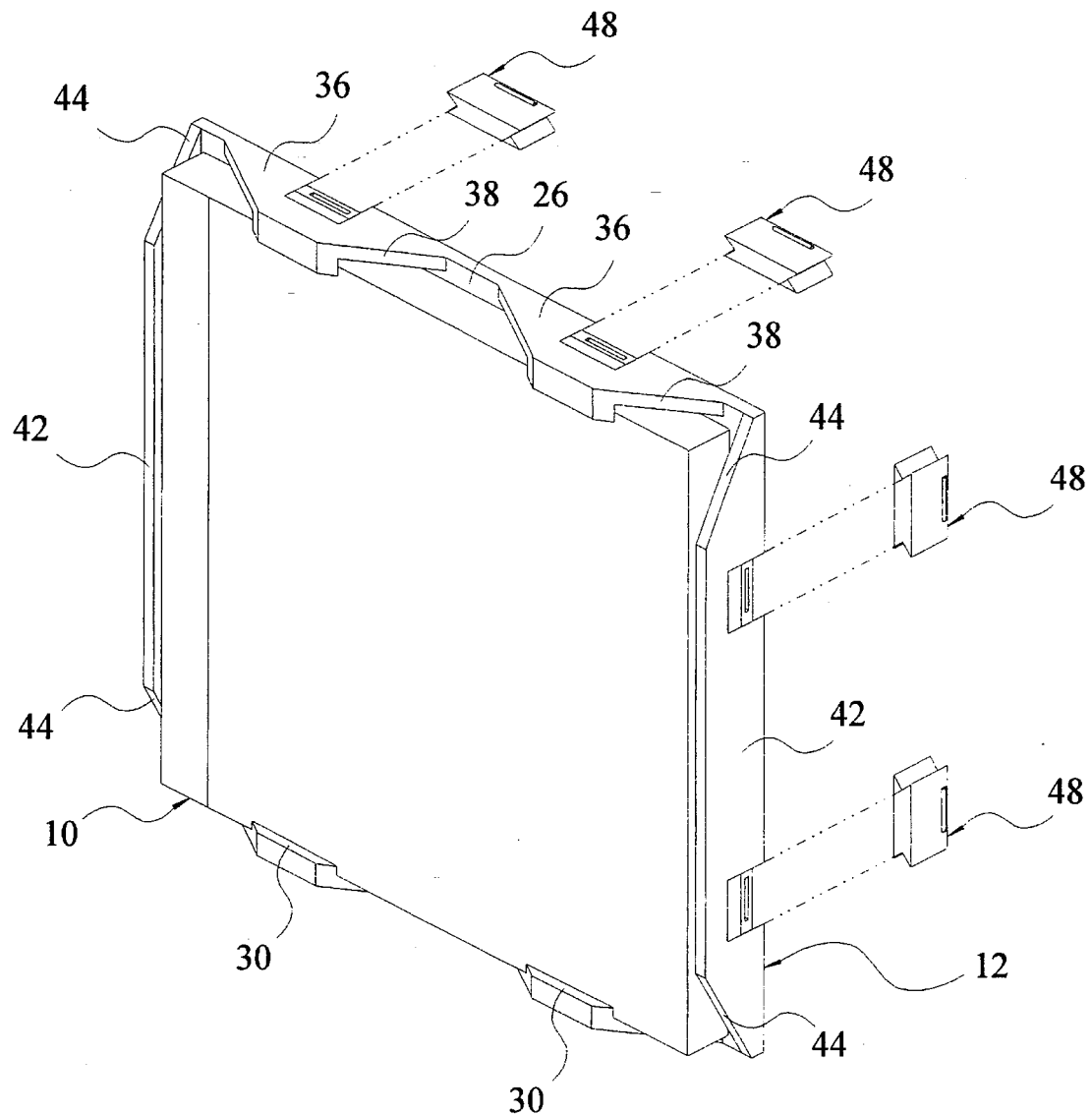
FIG. 2 is a frontal perspective view of the invention with jewel case stored therein.
Figure 3:
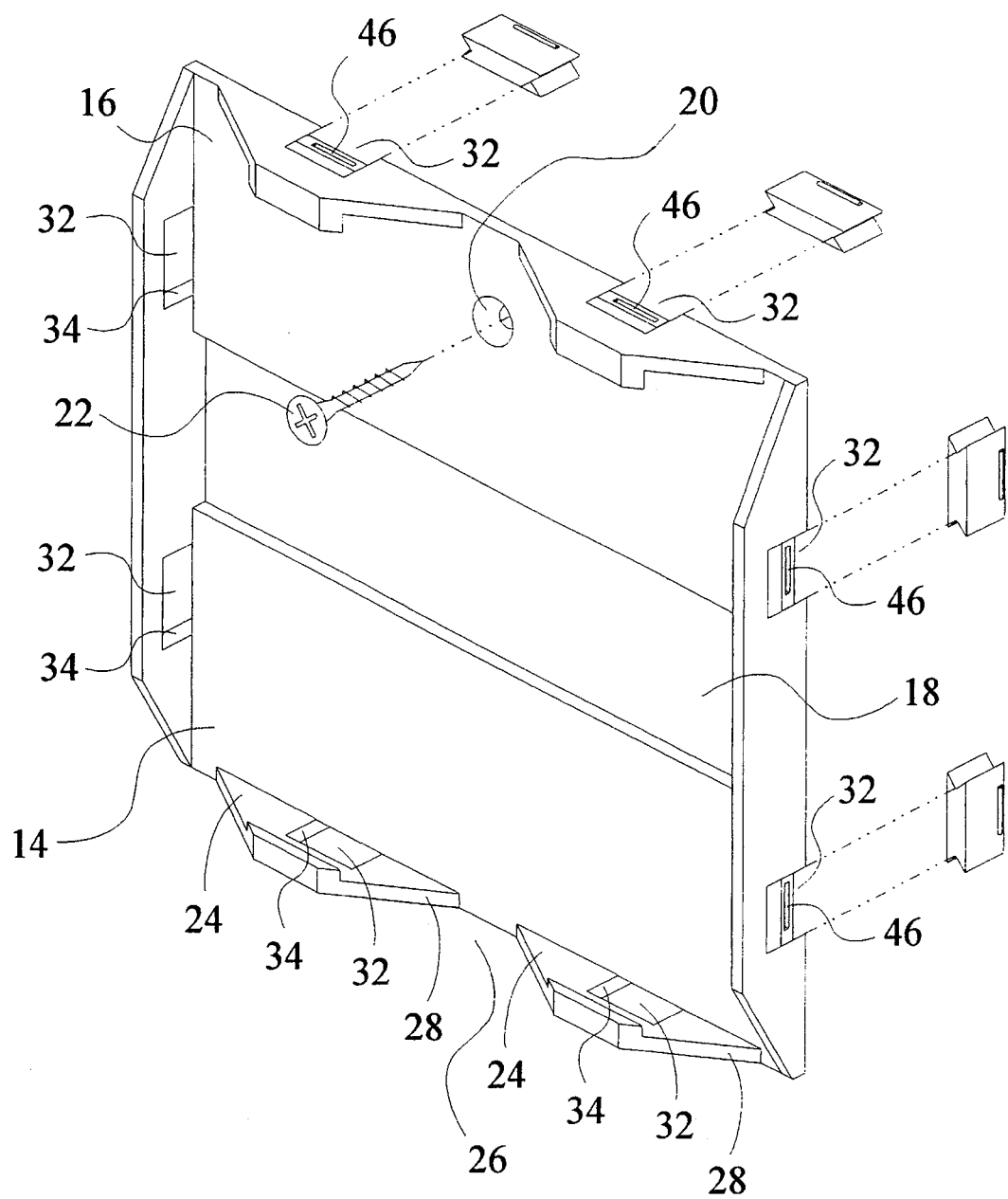
FIG. 3 is a frontal perspective view of invention including the interlocking mechanism.
Figure 4:
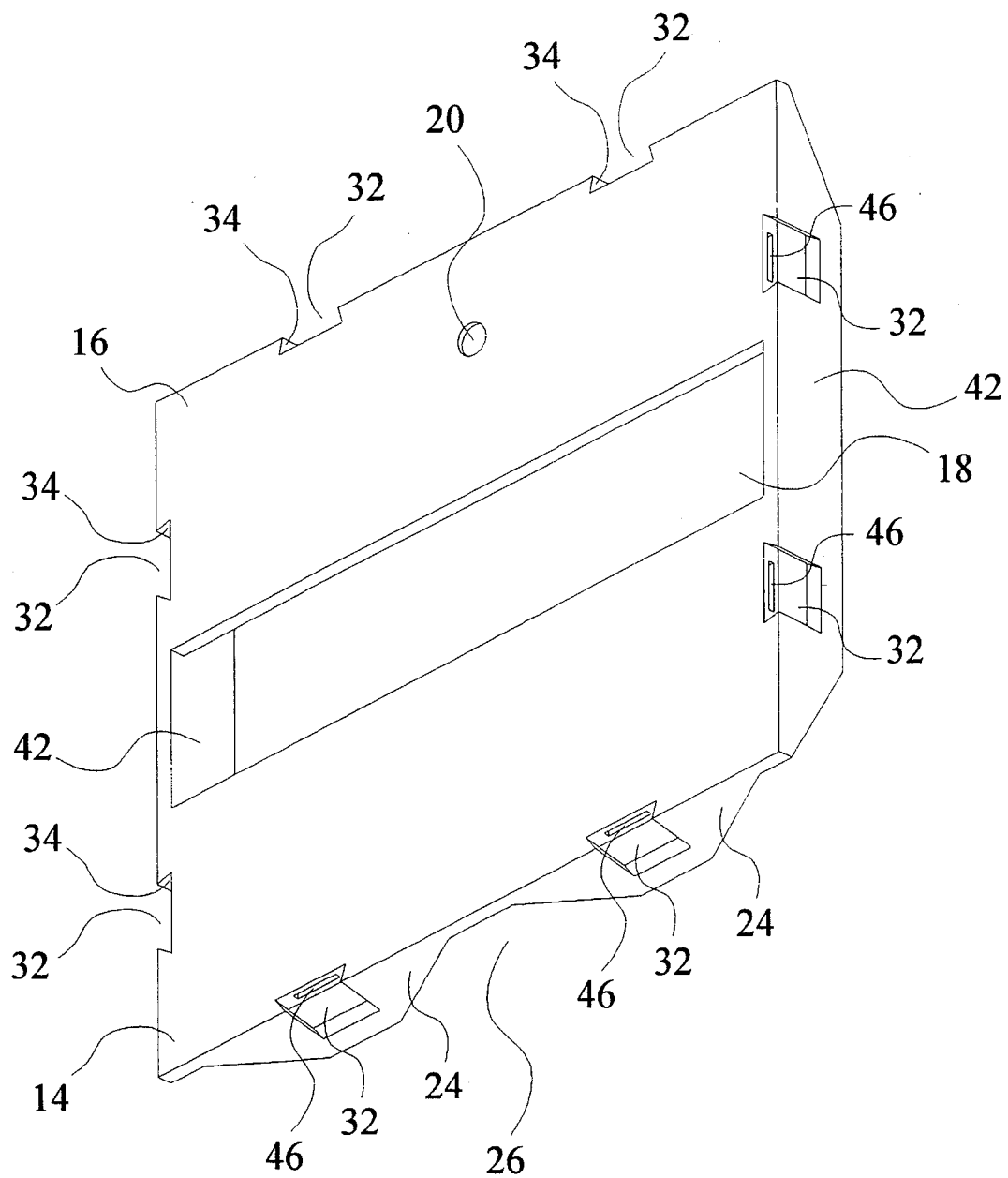
FIG. 4 is a lower rearview perspective of the invention.
Figure 5A:
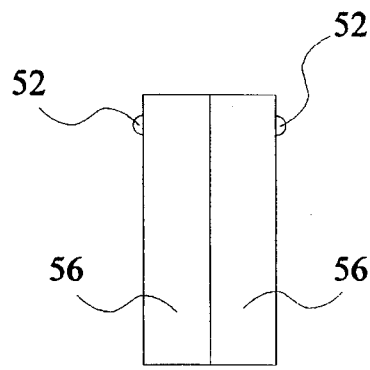
FIG. 5 is a perspective view of interlocking mechanism.
Figure 5B:
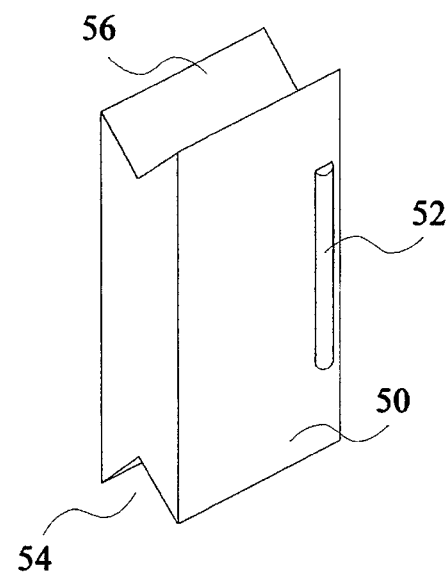
Figure 5C:
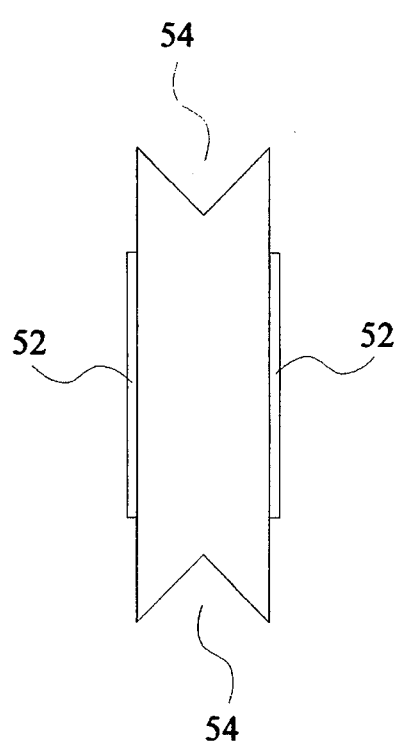
Figure 5D:
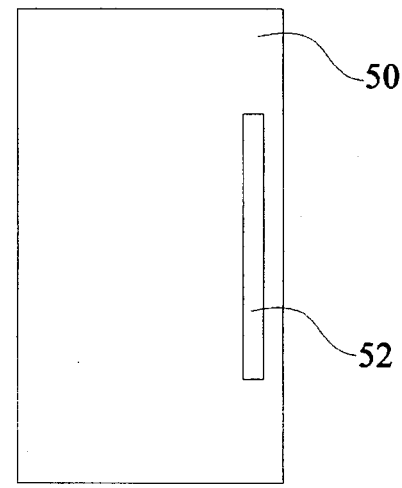

The device of the present invention for storing and displaying compact disc jewel cases is shown by example in FIGS. 1–5. The illustrated example in FIG. 1 includes a plurality of modular devices 12 with jewel cases 10 contained therein, which maybe arranged in a variety of patterns depending upon the specific requirements of the user. The illustrated example in FIGS. 2–3 show the a device 12, wherein the flat vertical backwall consists of a lower panel 14 which is vertically aligned and separated from an upper panel 16 by an opening 18, whereto the combined height of the aforementioned parts and opening slightly exceeds that of a typical jewel case 10. Incorporated into upper panel 16 is a centrally located tapered bore 20 for attaching device 12 to a flat vertical surface, such as a wall by the utilization of a screw 22.

Physically integrated and appostionally placed along the front lower horizontal edge of lower panel 14 and forming the lower floor of device 12 are two identical lower dogs 24 of trapezoid shape separated by a gap 26, wherein the vertical centerline of each lower dog 24 is located ¼ of the total width of device 12 from the vertical outside edge. Each lower dog 24 is provided with a left and a right lower angled face 28. Each lower dog 24 incorporates a lower stop 30 of trapezoid shape projecting upward from the top surface along the front edge, the height wherein being sufficient to releasably retain jewel case 10, and the depth between the rear vertical surface of lower stop 30 and the front vertical surface of lower panel 14 being slightly larger than the thickness of jewel case 10. Each lower dog 24 also incorporates a recess 32 of dovetail cross-section centrally positioned along the rear edge. The narrow opening of each recess 32 being, integrated into the bottom surface of each lower dog 24, and the wider opening being integrated into the top surface. Recess 32 is comprised of two opposing slants 34 wherein for purposes of example only, are set at forty five degree angles relative to the upper surface of lower dog 24.

Physically integrated and appostionally placed along the front upper horizontal edge of upper panel 14 and forming the top of device 12, are two identical upper dogs 36 of trapezoid shape separated by a gap 26, wherein the vertical centerline of each upper dog 36 is vertically aligned with that of the corresponding lower dogs 24 integrated onto lower panel 14. Each upper dog 36 is provided with a left and a right upper angled face 38. Each upper dog 36 incorporates an upper stop 40 of trapezoid shape projecting downward from the bottom surface along the front edge, the height wherein being sufficient to releasably retain jewel case 10, and the depth between the rear vertical surface of upper stop 40 and the front vertical surface of upper panel 16 being slightly larger than the thickness of jewel case 10. Each upper dog 36 also incorporates a recess 32 of dovetail cross-section centrally positioned along the rear edge. The wider opening of recess 32 being integrated into the bottom surface of upper dog 36, and the narrow opening being integrated into the top surface. Each recess 32 is comprised of two opposing slants 34 wherein for purposes of example only, are set at forty five degree angles relative to the lower surface of upper dog 36.

Linking lower panel 14 to upper panel 16 together, and serving as the vertical sidewalls of device 12 are a left rib 42 and a right rib 42 of trapezoid shape, wherein each rib 42 is perpendicular and physically integrated to the narrow vertical edge of both lower panel 14 and upper panel 16 on opposing sides of device 12, and the width between each rib 41 measures slightly more than the width of jewel case 10. Each rib 42 incorporates an angled upper leading edge 44 and an angled lower leading edge 44.

Physically integrated into the rear edge of each rib 42 are two recesses 32 of dovetail cross-section, wherein the horizontal centerline of the top recess 32 is located ¼ the total height of the device 12 from the top edge thereof, and the horizontal centerline of the lower recess 32 is located ¼ the total height of device 12 from the bottom edge thereof. The narrow opening of recess 32 being integrated into the outside surface of each rib 42, and the wider opening being integrated into the inside surface. Each recess 32 is comprised of two opposing slants 34 wherein for purposes of example only, are set at forty five degree angles relative to the inner surface of each rib 42.

Both lower panel 14 and upper panel 16 incorporate a plurality of mortises 46, which are aligned with each recess 32. These parts are functionally utilized in conjunction with the embodiment of a key 48. FIG. 5 illustrates the embodiment of a key 48 of bow-tie shape comprised of two parallel rectangular flat surfaces 50, each surface 50 incorporating a fillet 52 located adjacent and parallel to the long edge thereof, and syncline grooves 54 integrated into opposing sides of the narrow short edge, perpendicular to fillet 52. The shape of each fillet 52 is comprised of ½ of a laterally bisected narrow cylinder, wherein the length and width is slightly smaller than that of mortise 46. Each groove incorporates two faces 56, wherein for proposes of example only, the relative angle between each opposing face 56 being ninety degrees, and the relative angle between each face 56 and the corresponding surface 50 being three hundred fifteen degrees respectively. The selected angle of the each face 56 of each key 48 correspondingly matches the angle of each slant 34 of each recess 32.

OPERATION OF INVENTION

Figure 6:
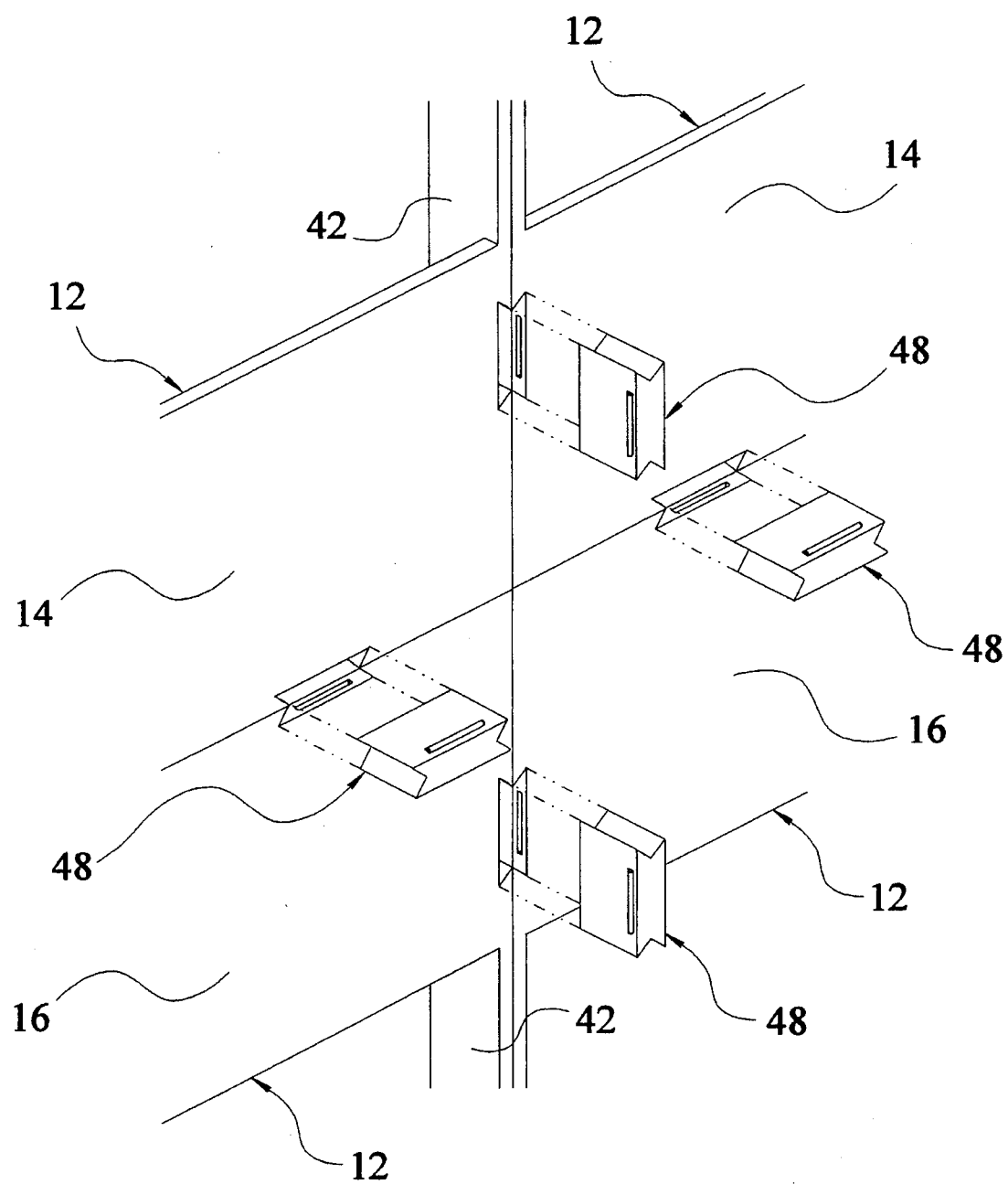
FIG. 6 is a rear perspective view of four individual devices illustrating their joint configuration.
Figure 7:
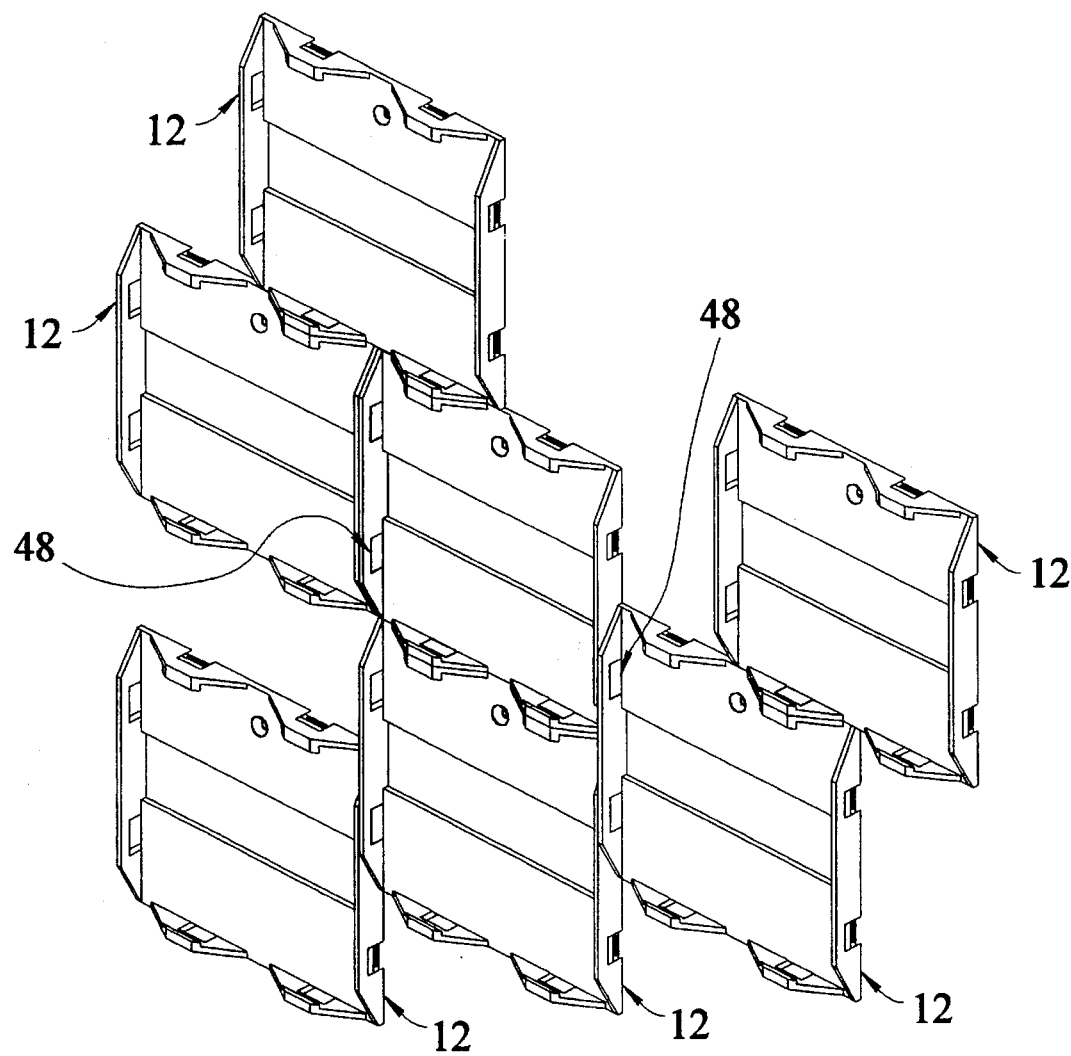
FIG. 7 is a frontal perspective view illustrating all possible configurations that the devices can be joined together.
Figure 8:
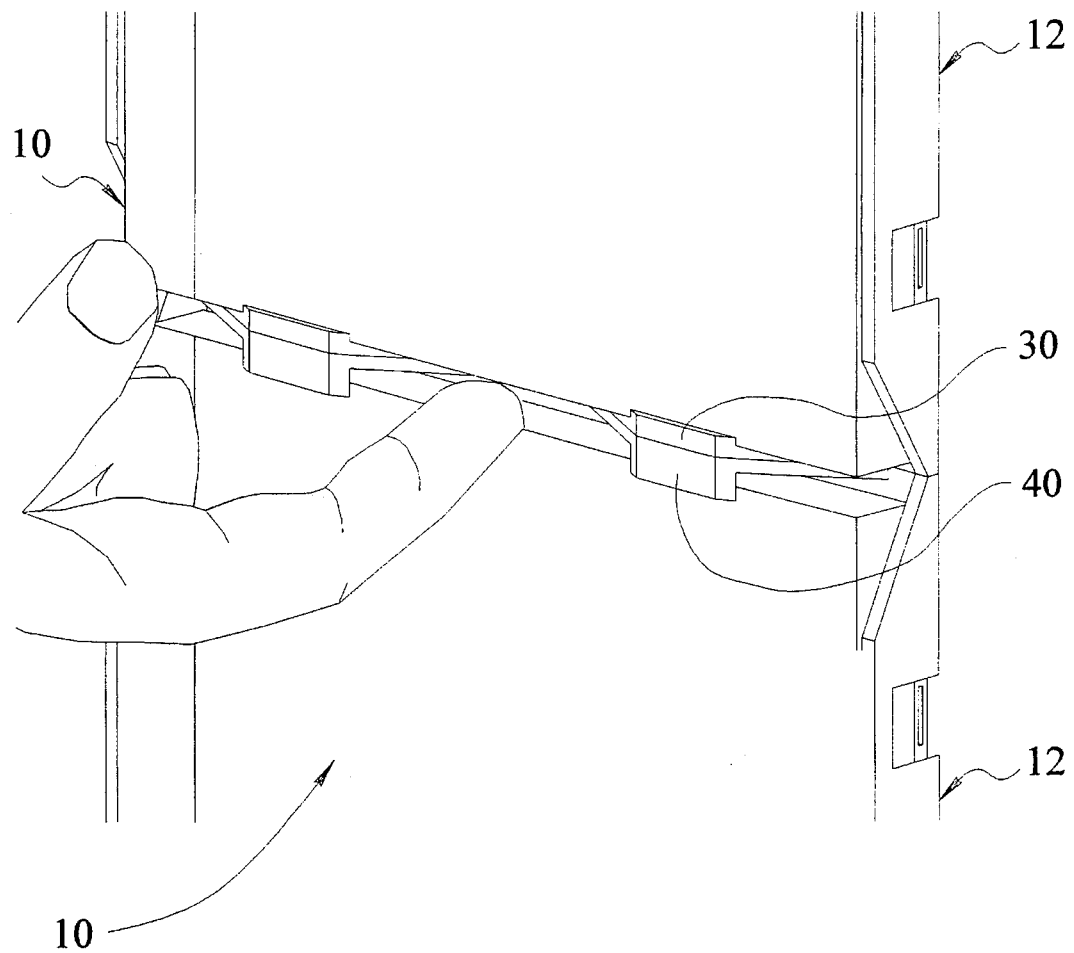
FIG. 8 is a frontal perspective view of two joined devices illustrating the method of removal for jewel case therein.
Figure 9:
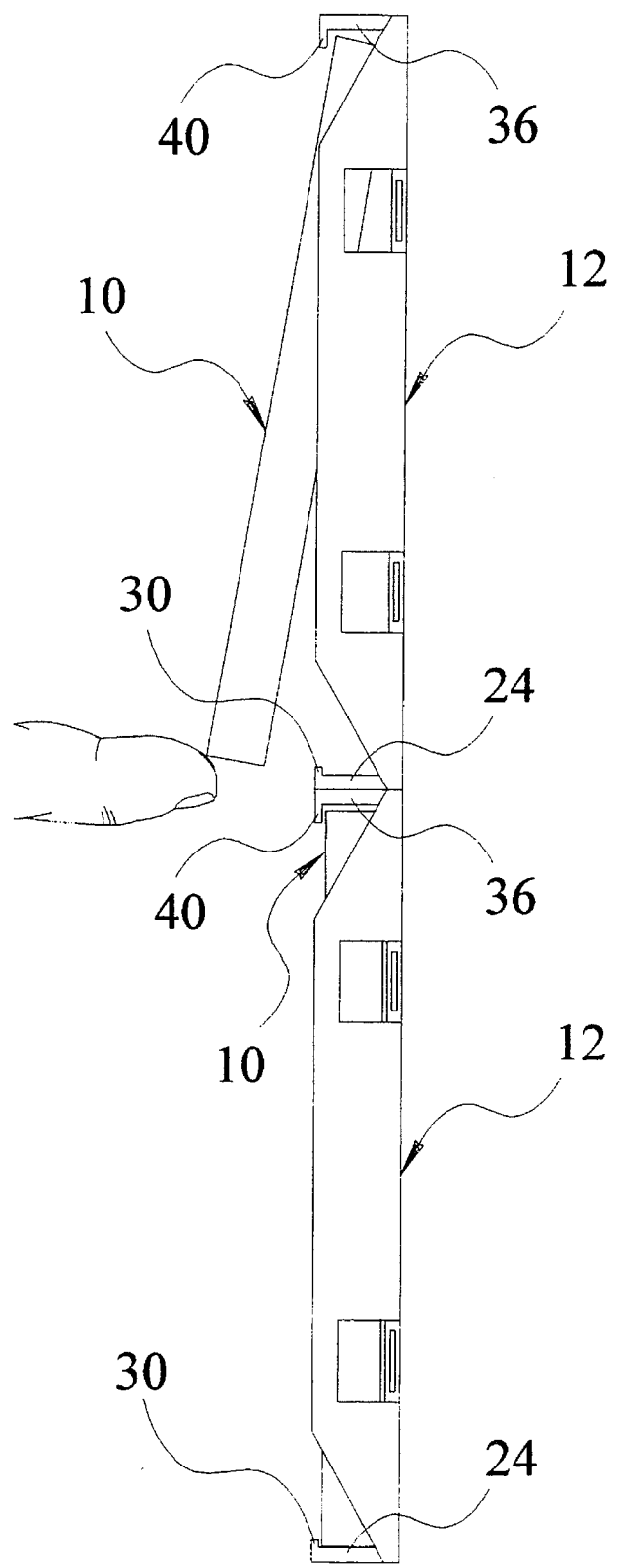
FIG. 9 is a side view of two joined devices illustrating the method of removal for the jewel case therein.

The utilization of the modular storage and display device is illustrated in FIGS. 1, 2, 6, 7, 8, and 9. Namely one arranges a pattern of devices 12 such as illustrated in FIG. 1 face down on a flat horizontal surface. FIG. 6 illustrates atypical arrangement of four adjacent devices 12 and the utilization of keys 48. After positioning devices 12 wherein all horizontal and vertical recesses 32 are adjacent to one another, the user inserts a key 48 into each adjacent recess 32. The user applies pressure to the back of key 48 until the fillets 52 mate with their perspective mortises 46. Once the devices 12 are interlocked, the user then attaches the plurality of devices 12 to a vertical flat surface, each as a wall utilizing screws 22. It should be noted that additional devices can be added to the grouping without removing the entire assembly from the wall. Disassembling a grouping of device 12 is accomplished by first removing the devices 12 from the wall. Then grasping two adjacent devices 12, the user then slightly bends the two units so that a gap is made between the two back edges, so that the fillets 52 on each key 48 unlock from their perspective mortises 46, whereby the user then pushes one device 12 forward and one device 12 backward to disengage the devices from one another.

In practice, and with reference only to the example of an individual device 12, a jewel case 10 is placed and held securely by tilting the uppermost edge jewel case 10 backward away from the user towards the top inner surface behind upper stops 40. When the upper edge of jewel case 10 is secured behind upper stops 40, the bottom edge of jewel case 10 is tilted backward away from the user until it clears lower stops 30, where jewel case 10 is then gently lowered behind lower stops 30. Each lower dog 24 and each upper dog 36, working in concert with lower stops 30 and upper stops 40, hold jewel case 10 securely in place. The removal of jewel case 10 simply requires the user to place a finger into gap 26 between lower stops 30, then apply slight upward pressure along the bottom edge of jewel case 10 until it clears lower stops 30. Using the fingers as a guide, the lower edge of jewel case 10 is tilted outward toward the user and then lowered to allow the top section of the case to clear upper stops 40. At this point the user simply grasps jewel case 10 with two or more fingers to remove it from device 12. The utilization of gap 26 between each lower dog 24 and each upper dog 36 working in concert with the angled upper and lower leading edge 44 of each rib 42 allow the user total access to insert or remove jewel case 10 regardless of whatever pattern of devices 12 are assembled.

SUMMARY, RAMIFICATIONS, AND SCOPE

Accordingly, the reader will see that the modular storage and display device is a universal device that can be utilized by all ages to store and display a compact disc jewel case with relative ease, and that the device allows the user total access to install and remove any jewel case with the use of one hand. In addition, it allows the user to assemble a mosaic picture wall that conforms to their tastes and will enhance the appearance of their collection of media without being limited to horizontal or vertical rows, or by a predetermined number of cases that can be displayed at any given time. Furthermore, the modular storage and display device has the additional advantages in that it provides a stability factor unseen in the prior art that ensures that the jewel cases will stay in their perspective modular unit until such time as the user wants to remove them.

it ensures that small toddlers will not have the capacity to remove a whole row of jewel cases with the swipe of a hand.

it provides a degree of stability which will hold each jewel case in place until the device is tilted forward at least ninety degrees.

Although the description above contains many specificities, these should not be construed as limiting the scope of the invention but as merely providing illustrations of some of the presently preferred embodiments of this invention. For example the device can be scaled up or down in size to accommodate any vertically oriented narrow flat rectangular objects; the device could have one solid backpanel; the upper and lower dogs of the device can have other shapes, such as rectangular, semi-circular; the left and right side ribs could be of rectangular shape; the left and right angled face of each upper dog and each lower dog could be of concave shape; the upper and lower leading edge of each side rib could be of concave drape or of convex shape; the device could have projections of dovetail cross-section integrated onto one side and corresponding recesses of dovetail cross-section on the opposing side; the device could have projections of dovetail cross-section integrated onto each upper dog and corresponding recesses of dovetail cross-section integrated into the opposing lower dogs; the device could have projections of dovetail cross-section integrated onto each lower dog and corresponding recesses of dovetail cross-section integrated into the opposing upper dogs; the key could utilize a mortise on each side and the device could utilize a corresponding fillet, etc.

Thus, the scope of the invention should be determined by the appended claims and their legal equivalents, rather than by the examples given.

I claim:

1. In a device for storing and displaying one or more compact disc jewel cases comprising:, a. one or more modular units each having a back portion defined by at least one or more vertically adjacent flat panel elements, a top portion defined by at least two identical upper dog elements, a base portion defined by at least two identical lower dog elements, a left sidewall rib element, a right sidewall rib element;

b. means for releasably retaining said jewel case within said modular unit, said means defined by an upper stop element descending from the front lower surface of each said upper dog element, and a lower stop element ascending from the front upper surface of each said lower dog element;

c. means formed integral with each said modular unit for releasable coupling with the vertically, horizontally, or diagonally next adjacent modular unit to form a generally mosaic picture wall of said modular units, said means including at least one recess element of dovetail cross-section defined into each said left rib element, at least one recess element of dovetail cross-section defined into each said right rib element, at least one recess element of dovetail cross-section defined into each said upper dog element, at least one recess element of dovetail cross-section defined into each said lower dog element and a key element for engaging the corresponding recess element defined at the respective rib element or dog element of the vertically, horizontally, or diagonally next adjacent modular unit;

d. means formed integral with each said key element and each said modular unit for a releasable locking mechanism, said means including a fillet element defined onto each said key element for engaging a corresponding mortise element defined into edge of each said back panel element of each said modular unit;

e. means for mounting said device against a vertical flat surface.

2. The device of claim 1 wherein each said upper dog element, each said lower dog element, each said upper stop element, and each said lower stop element, are of trapezoid shape.

3. The device of claim 1 wherein each said upper dog element, each said lower dog element, each said upper stop element, and each said lower stop element are of rectangular shape.

4. The device of claim 1 wherein the said backpanel element is defined by a single flat panel.

5. The device of claim 1 wherein each said upper dog element and each said lower dog element are of semicircular shape.

6. The device of claim 1 whereto each said upper dog element and each said lower dog element are defined with a left angled face element and a right angled face element of concave shape.

7. The device of claim 1 wherein the said left rib element is provided with at least one projection of dovetail cross-section and the said right rib element is provided with at least one recess of dovetail cross-section.

8. The device of claim 1 wherein the said right rib element is provided with at least one projection of dovetail cross-section and the said right left element is provided with at least one recess of dovetail cross-section.

9. The device of claim 1 wherein each said upper dog element is provided with at least one projection of dovetail cross-section and each said lower dog element is provided with at least one recess of dovetail cross-section.

10. The device of claim 1 wherein each said upper dog element is provided with at least one recess of dovetail cross-section and each said lower dog element is provided with at least one projection of dovetail cross-section.

11. The device of claim 1 wherein each said modular unit is provided with a plurality of fillet elements and each said key element is provided with a plurality of mortise elements.

12. The device of claim 1 wherein each said upper dog element and each said lower dog element is provided with a left angled face and a right angled face of concave shape.

13. The device of claim 1 wherein each said left side rib element and each said right side rib element is provided with a top leading edge and a bottom leading edge of concave shape.

14. In a device for storing and displaying one or more compact disc jewel cases comprising:

a. one or more modular units each having a back portion defined by two vertically adjacent flat panel elements, a top portion defined by at least two identical upper dog elements of trapezoid shape, a base portion defined by at least two identical lower dog elements of trapezoid shape, a left sidewall rib element of trapezoid shape, a right sidewall rib element of trapezoid shape, and a key element;

b. means for releasably retaining said jewel case within said modular unit, said means defined by an upper stop element of trapezoid shape descending from the front lower surface of each said upper dog element, and a lower stop element of trapezoid shape ascending from the front upper surface of each said lower dog element;

c. means formed integral with each said modular unit for releasable coupling with the vertically, horizontally, or diagonally next adjacent modular unit to form a generally mosaic picture wall of said modular units, said means including at least one recess element of dovetail cross-section defined into each said left rib element, at least one recess element of dovetail cross-section defined into each said right rib element, at least one recess element of dovetail cross-section defined into each said upper dog element, at least one recess element of dovetail cross-section defined into each said lower dog element and at least one said key element for engaging the corresponding recess element defined at the respective rib element or dog element of the vertically, horizontally or diagonally next adjacent modular unit;

d. means formed integral with each said key element and each said modular unit for a releasable locking mechanism, said means including a fillet element defined onto each said key element for engaging a corresponding mortise element defined into edge of each said back panel element of each said modular unit;

e. means for mounting said device against a vertical flat surface.

15. The device of claim 14 wherein the said left rib element is provided with at least one projection of dovetail cross-section and the said right rib element is provided with at least one recess of dovetail cross-section.

16. The device of claim 14 wherein the said right rib element is provided with at least one projection of dovetail cross-section and the said right left element is provided with at least one recess of dovetail cross-section.

17. The device of claim 14 wherein each said upper dog element is provided with at least one projection of dovetail cross-section and each said lower dog element is provided with at least one recess of dovetail cross-section.

18. The device of claim 14 wherein each said upper dog element is provided with at least one recess of dovetail cross-section and each said lower dog element is provided with at least one projection of dovetail cross-section.

19. The device of claim 14 wherein each said modular unit is provided with a plurality of fillet elements and each said key element is provided with a plurality of mortise elements.

* * * * *